US012676164B2

(12) United States Patent
Sharma et al.

(10) Patent No.: US 12,676,164 B2
(45) **Date of Patent: *Jul. 7, 2026**

(54) SYSTEM AND METHOD FOR MODULATION DOMAIN-BASED AUDIO SIGNAL ENCODING

(71) Applicant: Microsoft Technology Licensing, LLC, Redmond, WA (US)

(72) Inventors: Dushyant Sharma, Tracy, CA (US); Patrick Aubrey Naylor, Reading (GB); William Francis Ganong, III, Brookline, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

This patent is subject to a terminal disclaimer.

(21) Appl. No.: 18/334,442

(22) Filed: Jun. 14, 2023

(65) Prior Publication Data

US 2024/0420722 A1 Dec. 19, 2024

(51) Int. Cl.

| | |
|---|---|
| ***G10L 21/04*** | (2013.01) |
| ***G10L 21/003*** | (2013.01) |
| ***H04K 1/06*** | (2006.01) |

(52) U.S. Cl.
CPC .................................... *G10L 21/04* (2013.01)

(58) Field of Classification Search
CPC ......... G10L 21/04; G10L 21/003; H04K 1/06; H04L 63/061
See application file for complete search history.

(56) References Cited

U.S. PATENT DOCUMENTS

| | | | | |
|---|---|---|---|---|
| 5,995,539 | A * | 11/1999 | Miller | H04L 25/03343 375/222 |
| 8,223,872 | B1 * | 7/2012 | Zhang | H04L 25/03343 375/267 |
| 11,799,646 | B2 * | 10/2023 | Ramabadran | H04L 9/001 |
| 2003/0081705 | A1 * | 5/2003 | Miller | H04L 25/03343 375/346 |
| 2007/0100610 | A1 * | 5/2007 | Disch | G10L 19/0212 704/E19.02 |
| 2017/0245173 | A1 * | 8/2017 | Qian | H04L 1/0038 |
| 2020/0022143 | A1 * | 1/2020 | Abdoli | H04L 1/1887 |

(Continued)

FOREIGN PATENT DOCUMENTS

| | | | |
|---|---|---|---|
| WO | 2007107046 | A1 | 9/2007 |
| WO | 2014042715 | A1 | 3/2014 |
| WO | 2021219554 | A1 | 11/2021 |

OTHER PUBLICATIONS

Ozkan, et al., "Secure Voice Communication via GSM Network", In Proceedings of 7th International Conference on Electrical and Electronics Engineering, Dec. 1, 2011, pp. 267-271.

(Continued)

*Primary Examiner* — Michael N Opsasnick
(74) *Attorney, Agent, or Firm* — Foley IP Law, PLLC

(57) ABSTRACT

A method, computer program product, and computing system for processing an audio signal by converting the audio signal to the modulation domain. The modulation domain audio signal is encoded with a plurality of carrier signals and a plurality of modulator signals derived from the modulation domain audio signal. The encoded modulation domain audio signal is converted to the time domain.

20 Claims, 6 Drawing Sheets

(56) References Cited

U.S. PATENT DOCUMENTS

| | | | | |
|---|---|---|---|---|
| 2020/0258535 | A1 | 8/2020 | Vatanparvar | |
| 2021/0012026 | A1 | 1/2021 | Taylor | |
| 2022/0182271 | A1 * | 6/2022 | Shin | H04L 27/2639 |
| 2022/0199093 | A1 | 6/2022 | Ramadas | |
| 2023/0163902 | A1 * | 5/2023 | Saggar | H04L 5/0007<br>370/329 |
| 2024/0404504 | A1 * | 12/2024 | Sharma | G10L 15/26 |

OTHER PUBLICATIONS

Qi, et al., "A Speech Privacy Protection Method Based on Sound Masking and Speech Corpus", In Journal of Procedia computer science, vol. 131, Jan. 1, 2018, pp. 1269-1274.

International Search Report and Written Opinion received for PCT Application No. PCT/US2024/032459, Aug. 20, 2024, 13 pages.

"Vowel reduction", Retrieved From. https://en.wikipedia.org/wiki/Vowei_reduction, Jan. 23, 2022, 6 Pages.

Georges, et al., "Towards an articulatory-driven neural vocoder for speech synthesis", 12th International Seminar on Speech Production, Dec. 2020, 2 Pages.

International Preliminary Report on Patentability (Chapter I) received for PCT Application No. PCT/US2024/030184, mailed on Dec. 11, 2025, 11 pages.

International Search Report and Written Opinion received for PCT Application No. PCT/US2024/030184, Sep. 16, 2024, 19 pages.

Invitation to pay additional fees received for PCT Application No. PCT/US2024/030184, Jul. 26, 2024, 9 pages.

Koch, et al., "DigitalPhonetics / IMS-Toucan", Retrieved From: httpsligithub.comi'DigitalPhoneticsiliVIS-Toucan, Mar. 23, 2023, 11 Pages.

Lux, et al., "Language-Agnostic Meta-Learning for Low-Resource Text-to-Speech with Articulatory Features", In Repository of arXiv:2203.03191v1, Mar. 7, 2022, 12 Pages.

Murphy, James J. , "Demosthenes", Retrieved From: https://www.britannica.com/biographyiDernosthenes-Greekstatesman-and-orator, May 7, 2022, 10 Pages.

Non-Final Office Action mailed on Jun. 4, 2025, in U.S. Appl. No. 18/326,631, 12 pages.

Notice of Allowance mailed on Sep. 30, 2025, in U.S. Appl. No. 18/326,631, 16 Pages.

Sedivy, Julle, "Mumbling Isn't a Sign of Laziness—It's a Clever Data-Compression Trick", Retrieved From: https://nautil.usimumbling-isnt-a-sign-of-lazinessits-a-clever-data_compression-trick-235301,/, Feb. 18, 2015, 10 Pages.

Shor, et al., "Project Euphonia's Personalized Speech Recognition for Non-Standard Speech", Retrieved From: https://ai.googleblog.com/2019/08/project-euphonias-personalized-speech.html, Aug. 13, 2019, 7 Pages.

Son, et al., "An Acoustic Description of Consonant Reduction," Speech Communication, vol. 28, Issue 2, Jun. 1, 1999, pp. 125-140.

Weirich, et al., "Mumbling: Macho or Morphology?", In Journal of Speech, Language, and Hearing Research, vol. 59, Dec. 2016, pp. 1587-1595.

* cited by examiner

SYSTEM AND METHOD FOR MODULATION DOMAIN-BASED AUDIO SIGNAL ENCODING

BACKGROUND

Many audio signals include sensitive or private information (e.g., voice characteristics that identify a speaker or Personally Identifiable Information (PII)). In the context of a distributed speech processing system, such as (cloud based) ASR, securing the privacy of the audio signal (e.g., speech characteristics that could identify a speaker and/or the content of the audio signal) is of paramount importance. For example, an edge device (e.g., a microphone array or a mobile phone) may receive or process an audio signal. As the audio signal is transmitted to an intended destination (e.g., a speech processing system and/or a cloud-based server), the audio signal may be processed by various intermediate systems (e.g., telecommunication channel codecs). During this process, the privacy of the audio signal may be compromised by any person or device that intercepts and accesses the audio signal or impermissibly accesses the audio signal from a storage environment.

BRIEF DESCRIPTION OF THE DRAWINGS

Like reference symbols in the various drawings indicate like elements.

DETAILED DESCRIPTION OF THE PREFERRED EMBODIMENTS

Figure 1:
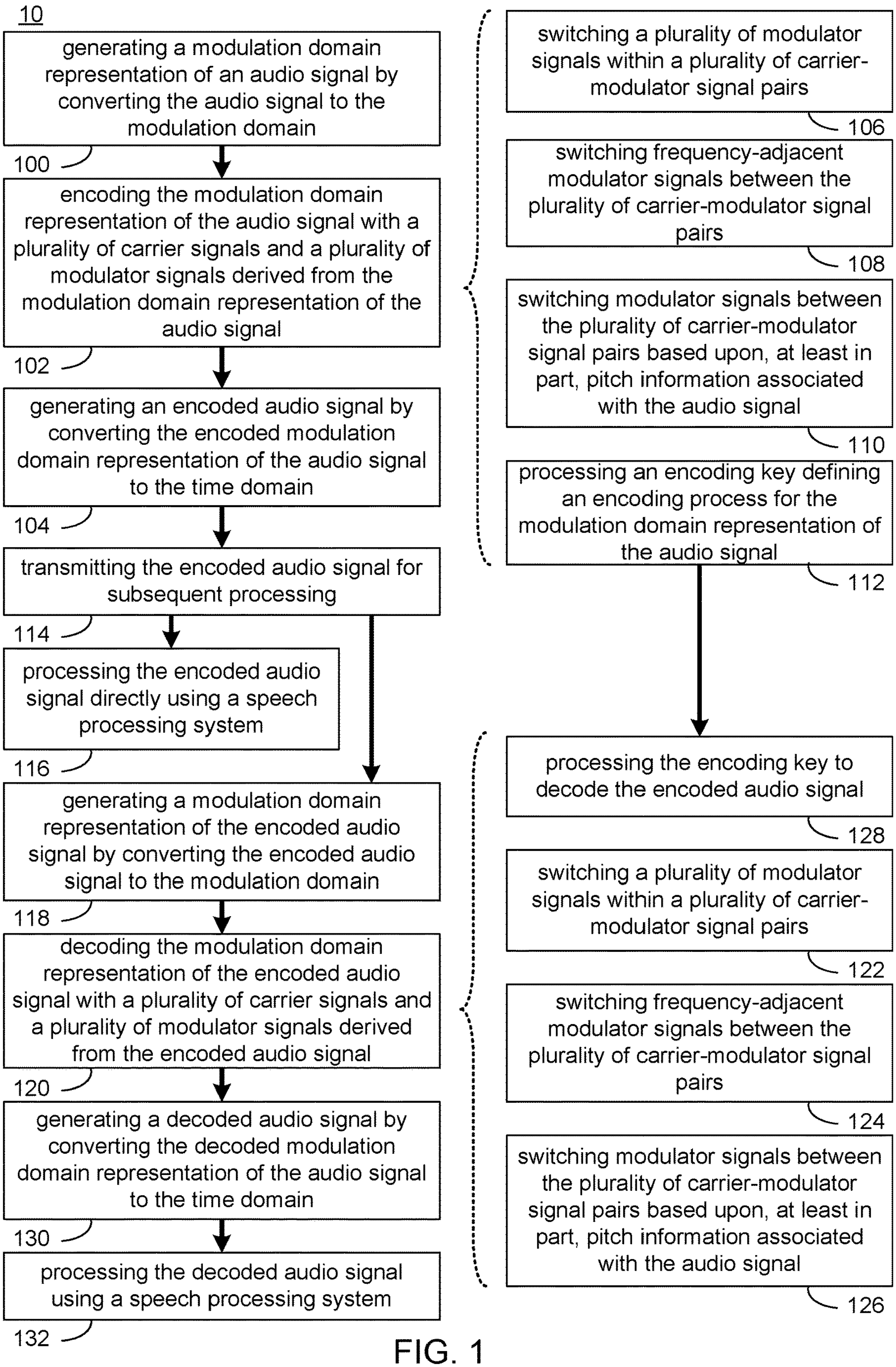
FIG. 1 is a flow chart of one implementation of the audio encoding process of FIG. 1.

Implementations of the present disclosure process an audio signal (e.g., a speech signal, a music signal, etc.) and encode the audio signal using modulation domain properties of the audio signal itself. Accordingly, by encoding the audio signal using the properties of the modulation domain, the content of the signal is rendered audibly unintelligible to an intercepting or intervening recipient with minimal impact on downstream audio processing; the audio signal is encoded and decoded in a generally lossless manner; and the audio signal can be transmitted across standard telecommunication channels.

The details of one or more implementations are set forth in the accompanying drawings and the description below. Other features and advantages will become apparent from the description, the drawings, and the claims.

The Audio Encoding Process:

As will be discussed in greater detail below, implementations of the present disclosure allow for the encoding of audio signals in the form of unintelligible audio (to a human listener) without adversely impacting downstream speech processing systems. For example, suppose an audio signal is a speech signal with sensitive content (e.g., PII). Conventional approaches to encoding audio signals modify the audio signal by adding or removing signal content in a manner that may degrade subsequent speech processing and/or prevent the encoded audio signal from being transmitted across standard telecommunication channels. Accordingly, by encoding the audio signal using modulation-domain properties from within the audio signal itself in the manner described below, downstream speech processing systems are able to process audio signal by either decoding the audio signal or by processing the encoded audio signal directly using a trained audio processing system (e.g., a speech processing system trained on encoded audio signals) and the encoded audio signal can be transmitted across standard telecommunication channels without compromising sensitive or private content. For example, if an encoded audio signal is impermissibly obtained (e.g., either during transmission or from storage), the encoded audio signal is unintelligible to that listener. With either a speech processing system trained to directly process the encoded audio signal or an encoding key for decoding, the audio signal can be processed in a generally lossless manner.

Referring to FIGS. 1-6, audio encoding process 10 generates 100 a modulation domain representation of an audio signal by converting the audio signal to the modulation domain. The modulation domain representation of the audio signal is encoded 102 with a plurality of carrier signals and a plurality of modulator signals derived from the modulation domain representation of the audio signal. The encoded audio signal is generated by converting 104 the modulation domain representation of the audio signal to the time domain.

In some implementations, audio encoding process 10 generates 100 a modulation domain representation of an audio signal by converting the audio signal to the modulation domain. In some implementations, an audio signal can be represented in the time, frequency, and/or modulation domains. In the time domain, an audio signal's amplitude or power is observed as a function of time. In the frequency domain, an audio signal's amplitude or power is observed as a function of frequency of the audio signal. In the modulation domain, an audio signal's power is observed as a function of both frequency and time. An audio signal in the modulation domain generally includes the combination of modulator signals and carrier signals. Modulation generally includes modulating a carrier signal with a modulator signal such that the "information" described or encoded in the modulator signal is conveyed via modulations to a carrier signal. For example, a carrier signal encodes a modulator signal by varying amplitude based on the modulator signal (i.e., amplitude modulation), by varying frequency based on the modulator signal (i.e., frequency modulation), by varying phase based on the modulator signal (i.e., phase modulation, and/or by varying a combination of amplitude, frequency, and/or phase of the modulator signal).

In some implementations, audio encoding process 10 generates a modulation domain representation of an audio signal by converting the audio signal to the modulation domain. As will be discussed in greater detail below, audio encoding process 10 generates an amplitude modulation domain representation for the audio signal. In one example, audio encoding process 10 converts the audio signal to the modulation domain by applying a short time Fourier transform twice: the first time to obtain the time-frequency representation or frequency spectrogram, and the second time along the frequency axis to obtain the modulation spectrogram. In this example, one dimension is the Fourier frequency and the other dimension is the modulation frequency. In another example, audio encoding process 10 converts audio signal to a modulation domain representation using a sum-of-products model. For example, an audio signal with speech components can be modeled as the sum of the product of low-frequency temporal envelopes/modulator signals and carrier signals. An audio signal x(n) with time index n comprises discrete temporal samples. In some implementations, the audio signal is the sum of analytic signals in k=1, 2, . . . , K frequency bands. The analytic signals are quasi-sinusoidal tones which are modulated by temporal amplitudes, $m_k(n)$, representing low-frequency temporal envelopes which can be represented as shown below in Equation 1.

$$x(n) = \sum_{k=0}^{K-1} x_k(n) = \sum_{k=0}^{K-1} m_k(n)\, c_k(n) \tag{1}$$

where $c_k(n)$ represents the carrier signals or carriers.

As shown above, the sum-of-products model decomposes the audio signal into a plurality of carrier signals and a plurality of modulator signals. In some implementations, the modulator signal or modulator is the Hilbert envelope of the analytic signal in each frequency band. Therefore, the modulator is real-valued and non-negative, and the carrier is unit-magnitude as shown below in Equation 2.

$$c_k(n) = e^{j\phi_k(n)} \tag{2}$$

where $\phi_k(n)$ is the discrete sample of instantaneous phase which is a continuous function of time.

Figure 2:
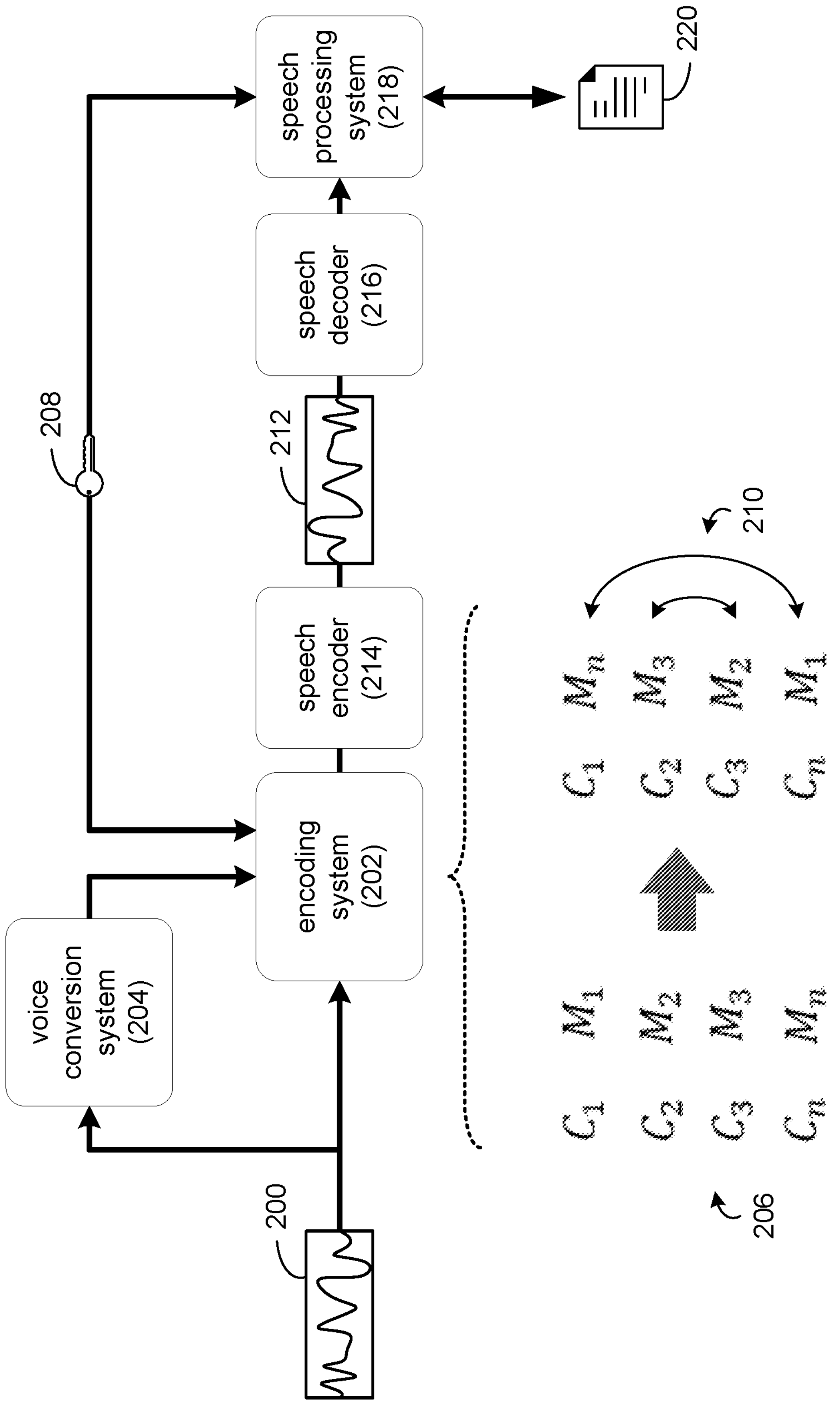
FIGS. 2-5 are diagrammatic views of the audio encoding process of FIG. 1.
Figure 3:
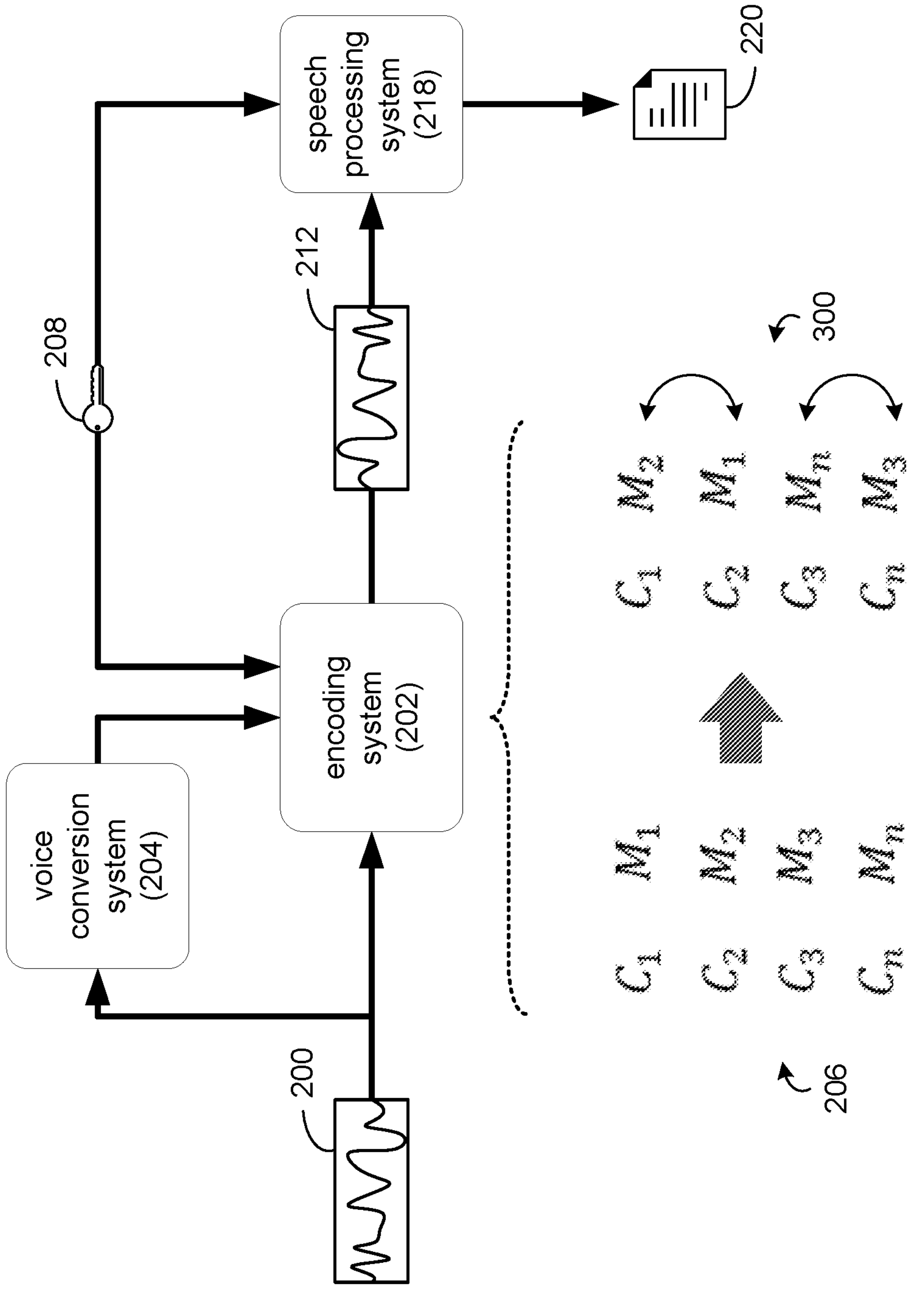
Figure 4:
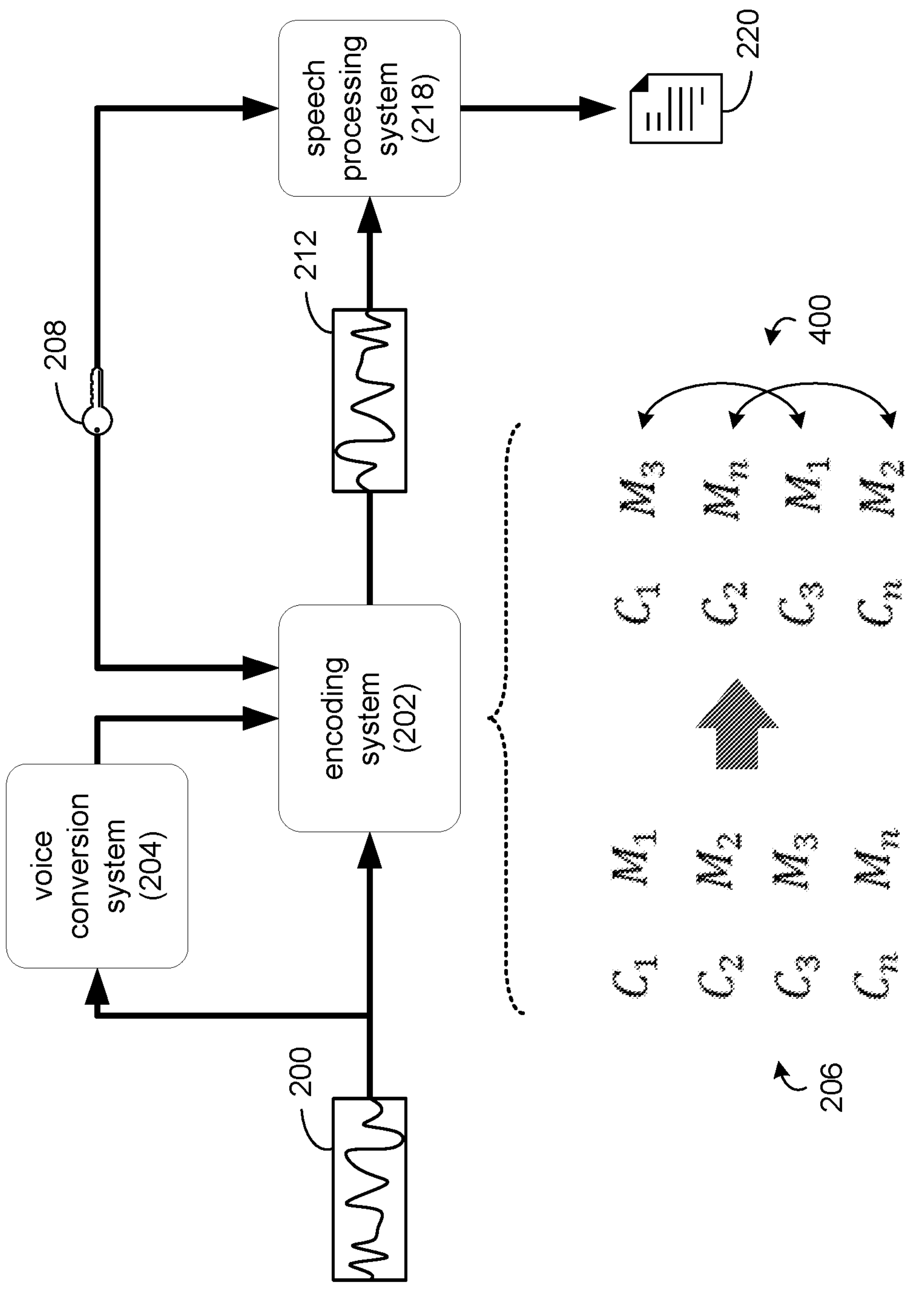

Referring also to FIG. 2 audio encoding process 10 generates a modulation domain representation of an audio signal (e.g., audio signal 200) by converting audio signal 200 to the modulation domain. As shown in FIG. 2, converting audio signal 200 is performed by an encoding system (e.g., encoding system 202). In another example, audio encoding process 10 converts audio signal 200 using a signal conversion system separate from encoding system 202.

In some implementations, audio encoding process 10 processes audio signal 200 using a voice conversion system (e.g., voice conversion system 204) before converting the audio signal to the modulation domain to protect a speaker's voice characteristics. A voice style transfer, also called voice conversion, is the modification of a speaker's voice to generate speech as if it came from another (target) speaker. For example, audio encoding process 10 generates a voice style transfer of the audio signal using a voice conversion system (e.g., voice conversion system 204). In some implementations, audio encoding process 10 generates a voice style transfer of audio signal 200 using a target speaker. Generating the voice style transfer includes modifying the acoustic characteristics of audio signal 200 to match (or generally match subject to a predefined threshold) a target speaker representation. In some implementations, the target speaker representation includes a predefined set of acoustic characteristics associated with a particular speaker. In this example, voice conversion system 204 generates a voice style transfer of audio signal 200 and the voice style transfer of audio signal 200 is converted to the modulation domain as discussed above.

In some implementations, audio encoding process 10 encodes 102 the modulation domain representation of the audio signal with a plurality of carrier signals and a plurality of modulator signals derived from the modulation domain representation of the audio signal. Referring again to FIG. 2, audio encoding process 10 generates 100 a modulation domain representation of audio signal 200 (e.g., modulation domain representation 206) by converting audio signal 200 to the modulation domain, where modulation domain representation 206 includes a plurality of carrier signals and a plurality of modulator signals. With encoding system 202, audio encoding process 10 encodes 102 modulation domain representation 206 with a plurality of carrier signals (e.g., shown as $C_1$, $C_2$, $C_3$, $C_n$ in modulation domain representation 206) and a plurality of modulator signals (e.g., shown as $M_1$, $M_2$, $M_3$, $M_n$ in modulation domain representation 206) derived from modulation domain representation 206. As shown in FIG. 2, each carrier signal has a corresponding modulator signal (e.g., $C_1$, $M_1$; $C_2$, $M_2$; $C_3$, $M_3$; $C_n$, $M_n$). These are referred to below as carrier-modulator signal pairs. As will be discussed in greater detail below, audio encoding process 10 encodes 102 modulation domain representation 206 by reordering or scrambling the modulator signals relative to their original carrier signals from respective carrier-modulator signal pairs to encode the content of audio signal 200 such that the resulting encoded audio signal is audibly unintelligible to intercepting listeners.

In some implementations, encoding 102 the modulation domain audio signal includes switching 106 a plurality of modulator signals within a plurality of carrier-modulator signal pairs. Switching 106 the plurality of modulator signals within the plurality of carrier-modulator signal pairs includes switching modulator signals from the lowest frequency carrier-modulator pairs with higher frequencies and switching the modulator signals from highest frequency carrier-modulator pairs with lower frequencies. For example, suppose the carrier-modulator signal pair $C_1$, $M_1$ represents the carrier-modulator pair with the lowest frequency modulator signal and the carrier-modulator signal pair $C_n$, $M_n$ represents the carrier-modulator pair with the highest frequency modulator signal. In this example, audio encoding process 10 switches 106 the plurality of modulator signals within the plurality of carrier-modulator signal pairs by switching $M_1$ with $M_n$ and $M_2$ with $M_3$ to generate an encoded modulation domain audio signal (e.g., encoded modulation domain audio signal 210). Accordingly, the lower frequency modulator signals (i.e., $M_1$ and $M_2$) are switched with the higher frequency signals (i.e., $M_2$ and $M_3$).

In some implementations, switching 106 the plurality of modulator signals within the plurality of carrier-modulator signal pairs includes switching 108 frequency-adjacent modulator signals between the plurality of carrier-modulator signal pairs. Frequency-adjacent modulator signals are modulator signals with frequency values or other signal characteristics that are relatively similar or adjacent to other modulator signals within the plurality of modulator signals. For example and referring also to FIG. 3, suppose the carrier-modulator signal pair $C_1$, $M_1$ represents the carrier-modulator pair with the lowest frequency modulator signal and the carrier-modulator signal pair $C_2$, $M_2$ represents the next lowest (but higher) frequency modulator signal. Further suppose that the carrier-modulator signal pair $C_n$, $M_n$ represents the carrier-modulator pair with the highest frequency modulator signal and the carrier-modulator signal pair $C_3$, $M_n$ represents the next highest (but lower) frequency modulator signal. In this example, $M_1$ and $M_2$ are frequency-adjacent modulator signals and $M_3$ and $M_n$ are frequency-adjacent modulator signals. Accordingly, audio encoding process 10 switches 108 $M_1$ with $M_2$ and $M_3$ with $M_a$ to generate encoded modulation domain representation 300. In some implementations, audio encoding process 10 uses one or more thresholds to determine adjacent modulator signals.

In some implementations, encoding 102 the modulation domain audio signal includes switching 110 modulator signals between the plurality of carrier-modulator signal pairs based upon, at least in part, pitch information associated with the audio signal. For example, an audio signal includes pitch information (i.e., pitch measured as the acoustic parameter of fundamental frequency, pitch contour, and/or harmonic information). In some implementations, audio encoding process 10 switches 110 modulator signals to retain or synchronize the pitch information across the audio signal (e.g., when the audio signal includes voiced speech). For example and referring also to FIG. 4, suppose $M_1$ and $M_3$ provide similar contributions to the pitch contour within audio signal 200 and that $M_2$ and $M_n$ provide similar contributions to the pitch contour within audio signal 200. For example, by switching $M_1$ and $M_3$ and $M_2$ and $M_n$ the pitch contour and/or harmonic frequencies are retained while rendering the encoded audio signal unintelligible to a listener. Accordingly, audio encoding process 10 switches 110 $M_1$ with $M_3$ and $M_2$ with $M_a$ to generate encoded modulation domain representation 400. In this example, despite the switched modulator signals rendering the encoded speech signal unintelligible to a human listener, the pitch information is retained in the encoded audio signal.

In some implementations, encoding 102 the modulation domain audio signal includes processing 112 an encoding key defining an encoding process for the modulation domain audio signal. For example, audio encoding process 10 may use an encoding key (e.g., encoding key 208) to describe the encoding process or scheme for encoding the modulation domain audio signal. In some implementations, various encoding processes are used to encode various portions or segments of an audio signal. In this example, audio encoding process 10 processes multiple encoding keys or a comprehensive encoding key that describes the encoding process used to encode the various portions or segments of the audio signal.

Figure 5:
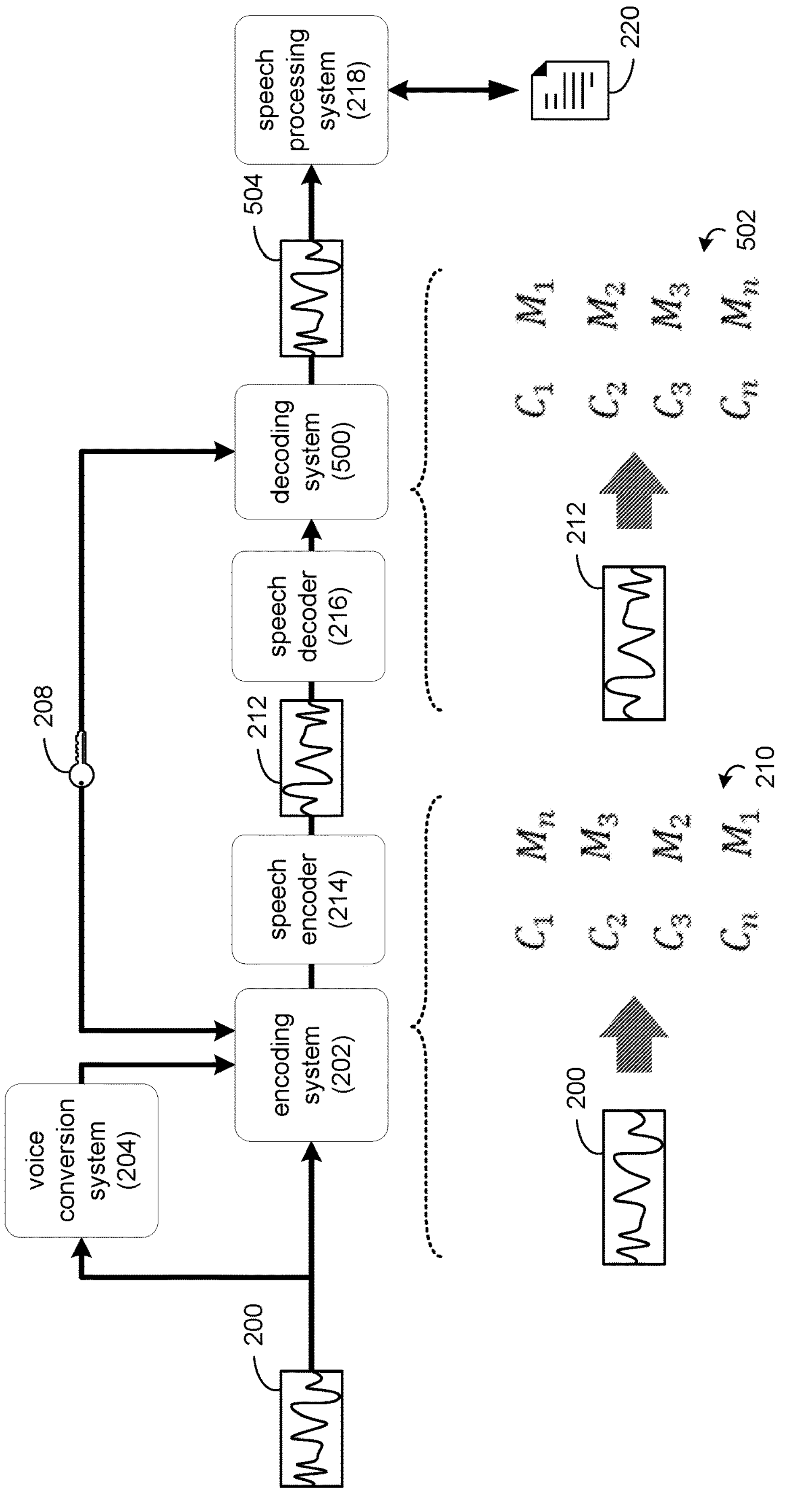

In some implementations, encoding key 208 is added to an encoded audio signal (e.g., encoded audio signal 212) in the form of a watermark (e.g., applied by encoding system 202). For example, encoding key 208 may include a alphanumerical representation that maps to particular encoding processes. In this manner, a receiving speech processing system (e.g., speech processing system 218) and/or decoding system (e.g., decoding system 500 as shown in FIG. 5) identifies encoding key 208 from encoded audio signal 212 and uses encoding key 208 to process encoded audio signal 212 or to decode encoded audio signal 212. As will be described in greater detail below and in one example, encoding key 208 is provided to decoding system 500 to decode the encoded audio signal. In another example, encoding key 208 is provided to speech processing system 218 to process the encoded audio signal.

In some implementations, audio encoding process 10 converts 104 the encoded modulation domain representation of the audio signal to the time domain. Referring again to FIGS. 2-5, audio encoding process 10 converts 104 the encoded modulation domain representation of the audio signal (e.g., encoded modulation domain representations 210, 300, 400) to the time domain. For example, audio encoding process 10 converts the plurality of carrier signals and modulator signals from the encoded modulation domain representation of the audio signal (e.g., encoded modulation domain representations 210, 300, 400) by performing an inverse Fourier transform twice and/or by performing an inverse sum-of-products approach as described above. In one example, encoding system 202 converts 104 the encoded modulation domain representation of the audio signal (e.g., encoded modulation domain representations 210, 300, 400) into encoded audio signal 212. In another example, a separate signal conversion system is used to convert 104 the encoded modulation domain representation of the audio signal (e.g., encoded modulation domain representations 210, 300, 400) into encoded audio signal 212.

In some implementations, audio encoding process 10 transmits 114 the encoded audio signal for subsequent processing. By encoding encoded audio signal 212 using modulation domain properties, encoded audio signal 212 is modified such that an intercepting party would not be able to understand the content of the audio signal. For example, by encoding using modulation domain properties, the original audio signal is rendered unintelligible to an intercepting party. Further, because audio encoding process 10 encodes 102 encoded audio signal 212 while sufficiently maintaining the speech-like properties of a signal exploited and supported in telecommunicates for transmission and storage, encoded audio signal 212 is able to be transmitted using standard telecommunication channels (e.g., 3G, 4G, and 5G telecommunication channels). For example, encoded audio signal 212 can be processed by codecs and other infrastructure of standard telecommunication channels without signal loss or signal complexity constraints. In some implementations, audio encoding process 10 transmits 114 encoded audio signal 212 to a remote storage system for storage and/or for subsequent processing. In this manner, encoded audio signal 212 is secure from unauthorized access to private or secure information.

In some implementations, when transmitting 114 encoded audio signal 212, audio encoding process 10 provides encoded audio signal 212 to a speech encoder (e.g., speech encoder 214). In one example, speech encoder 214 is a Global System Mobile (GSM) vocoder that encodes an input audio signal for transmission and processing within a telecommunication network. With the modulation domain-based encoding of encoded audio signal 212, speech encoder 214 further encodes encoded audio signal 212 for transmission and processing within a particular communication network without modifying the communication network and without exposing the speech content of encoded audio signal 212 to unauthorized recipients (e.g., recipients without an encoding key or trained speech processing system). Audio encoding process 10 can receive encoded audio signal 212 from speech encoder 214 and, using a corresponding speech decoder (e.g., speech decoder 216), the encoded audio signal 212 can be decoded from the encoding used for transmission and processing across the communication network. In one example, speech decoder 216 is a Global System Mobile (GSM) vocoder that decodes an input encoded audio signal for downstream processing.

Direct Encoded Audio Signal Processing

In some implementations, audio encoding process 10 processes 116 the encoded audio signal directly using a speech processing system. Referring again to FIGS. 2-4, audio encoding process 10 transmits 114 encoded audio signal 212 to a speech processing system (e.g., speech processing system 218). Examples of speech processing system include systems for automated speech recognition (ASR), speaker identification, biometric speaker verification, etc. For example, suppose speech processing system 218 is an ASR system configured to generate a transcript (e.g., transcript 220) of the encoded audio signal 212. In this example, speech processing system 218 is trained using encoded audio signals and corresponding labeled transcripts that "teach" speech processing system 218 to map the encoded audio signal to the correct unencoded transcript output. For example, encoded audio signal 212 is encoded such that the audio is unintelligible to a human listener from the modification to the carrier-modulator signal pairs as discussed above. By training speech processing system 218 with training encoded audio signals and corresponding labeled transcripts, speech processing system 218 directly processes 116 encoded audio signals without requiring any decoding. In this manner, the content of audio signal 200 is secure from the point of encoding to processing by speech processing system 218 because speech processing system 218 is trained to directly process 116 encoded audio signal.

Decoded Audio Signal Processing:

In some implementations, audio encoding process 10 processes encoded audio signal for transmission and decodes the original audio signal from the encoded audio signal. For example and referring again to FIG. 5, audio encoding process 10 generates 118 a modulation domain representation of the encoded audio signal by converting encoded audio signal 212 to the modulation domain. As discussed above, audio encoding process 10 converts encoded audio signal 212 to the modulation domain by applying the STFT twice and/or by the sum-of-products approach. The resulting modulation domain representation includes a plurality of carrier signals and modulator signals.

In some implementations, audio encoding process 10 decodes 120 the modulation domain representation of the encoded audio signal with a plurality of carrier signals and a plurality of modulator signals derived from the encoded modulation domain audio signal. For example, audio encoding process 10 uses a decoding system (e.g., decoding system 500) to decode the encoded modulation domain audio signal. As will be discussed in greater detail below, decoding system 500 can perform various decoding processes to unscramble the plurality of modulator signals within the encoded modulation domain audio signal.

In some implementations, decoding 120 the modulation domain representation of the encoded audio signal includes switching 122 a plurality of modulator signals within a plurality of carrier-modulator signal pairs. For example, suppose audio encoding process 10 encoded an encoded audio signal by switching $M_1$ with $M_n$ and $M_2$ with $M_3$ where the lower frequency modulator signals (i.e., $M_1$ and $M_2$) are switched with the higher frequency signals (i.e., $M_2$ and $M_3$). In this example, audio encoding process 10 decodes 120 these modulator signals by switching 122 $M_1$ with $M_n$ and $M_2$ with $M_3$ to generate a decoded modulation domain representation of the encoded audio signal (e.g., decoded modulation domain representation 502). In some implementations, decoded modulation domain representation 502 is identical to the original modulation domain representation (e.g., modulation domain representation 206).

In some implementations, decoding 120 the modulation domain representation of the encoded audio signal includes switching 124 frequency-adjacent modulator signals between the plurality of carrier-modulator signal pairs. For example, suppose that $M_1$ and $M_2$ are adjacent modulator signals and $M_3$ and $M_n$ are frequency-adjacent modulator signals. In this example, audio encoding process 10 decodes the modulation domain audio representation of the encoded audio signal by switching 124 $M_1$ with $M_2$ and $M_3$ with $M_n$ to generate decoded modulation domain representation 502.

In some implementations, decoding 120 the modulation domain representation of the encoded audio signal includes switching 126 modulator signals between the plurality of carrier-modulator signal pairs based upon, at least in part, pitch information associated with the audio signal. For example, suppose $M_1$ and $M_3$ provide similar contributions to the pitch contour within audio signal 200 and that $M_2$ and $M_n$ provide similar contributions to the pitch contour within audio signal 200. In this example, audio encoding process 10 decodes 120 the modulation domain representation of the encoded audio signal by switching 126 $M_1$ with $M_3$ and $M_2$ with $M_n$ to generate decoded modulation domain representation 502.

In some implementations, decoding 120 the modulation domain representation of the encoded audio signal includes processing the modulation domain representation of the encoded audio signal with a neural network-based decoding system. In one example, decoding system 500 includes a neural network trained to reconstruct an intelligible speech signal given an encoding key (encoding key 208) in and an encoded audio signal (e.g., encoded audio signal 212). In some implementations, decoding system 500 processes encoded audio signal 212 post standard speech decoding (e.g., via speech decoder 216). Decoding system 500, with a neural network trained to reconstruct audio signal 200 using encoding key 208 is able to tolerate more significant amounts of modulation domain-based encoding. For example, decoding system 500 with the neural network is able to account for more destructive mixing or switching of modulator signals within the modulation domain representation of the audio signal. In this manner, decoding system 500 decodes 120 the modulation domain representation of encoded audio signal 212 regardless of the severity of the switching of modulator signals.

In some implementations, decoding 120 the modulation domain representation of the encoded audio signal includes processing 128 the encoding key to decode the modulation domain representation of the encoded audio signal. In one example and as discussed above, audio encoding process 10 processes 128 encoding key 208 as a watermark from encoded audio signal 212. In another example, audio encoding process 10 obtains encoding key 208 from encoding system 202. In this example, encoding system 202 provides or transmits encoding key 208 separately from encoded audio signal 212. With encoding key 208, audio encoding process 10 performs the decoding process(es) to decode the modulation domain representation of the encoded audio signal.

In some implementations, audio encoding process 10 converts 130 the decoded modulation domain representation of the encoded audio signal to the time domain. As discussed above, audio encoding process 10 converts 130 the plurality of carrier signals and modulator signals from decoded modulation domain representation 502 to the time domain by applying an inverse STFT twice and/or by the inverse sum-of-products approach. In one example, decoding system 500 converts 130 decoded modulation domain representation 502 into decoded audio signal 504. In another example, a separate signal conversion system is used to convert 130 decoded modulation domain representation 502 into decoded audio signal 504.

In some implementations, audio encoding process 10 processes 132 the decoded audio signal using a speech processing system. For example, with decoded audio signal 504, audio encoding process 10 uses speech processing system 218 to audio encoding process 10 the decoded audio signal without special training (i.e., training to process encoded audio signal 212 directly). In this manner, decoded audio signal 504 is either effectively identical to audio signal 200 (e.g., when voice conversion system 204 is not used to perform a voice style transfer of audio signal 200) or includes the same content as audio signal 200 without the same voice characteristics as audio signal 200 (e.g., when voice conversion system 204 is used to perform a voice style transfer of audio signal 200).

In one implementation, an ASR speech processing system is used in three different configurations: 1) to process an original audio signal 200; 2) to process encoded audio signal 212; and 3) to process decoded audio signal 504. The Short-Time Objective Intelligibility (STOI) (i.e., an objective method for assessing speech intelligibility) and word error rate (WER) for each configuration are compared as shown below in Table 1:

TABLE 1

| Configuration | STOI | WER |
|---|---|---|
| Original audio signal | 1.0 | 8.0 |
| Decoded audio signal | 0.9 | 8.1 |
| Encoded audio signal | 0.2 | 9.1 |

As shown above, the intelligibility of encoded audio signal is significantly reduced compared to the original audio signal while the decoded audio signal only slightly degrades intelligibility with a minimal increase in the word error rate. In this manner, encoded audio signals are secure from unauthorized access of sensitive or private content by significantly reducing the intelligibility of the audio signal without comprising subsequent speech processing accuracy (i.e., when the encoded audio signal is decoded).

In another implementation, an ASR speech processing system is used in three different configurations: 1) to process an original audio signal 200; 2) to process decoded audio signal 504; and 3) to process text-to-speech (TTS) surrogation where sensitive content is replaced with surrogate words or phrases. The word error rate (WER) for each configuration is compared as shown below in Table 2:

TABLE 2

| Configuration | WER |
|---|---|
| Original audio signal | 4.0 |
| Decoded audio signal | 7.6 |
| TTS-based surrogation | 10.6 |

As shown above, the word error rate associated with the test audio signal using the decoded audio signal is significantly less than that of the TTS-based surrogation. In this manner, audio encoding process 10 provides a more robust processing accuracy compared to TTS-based surrogation.

Figure 6:
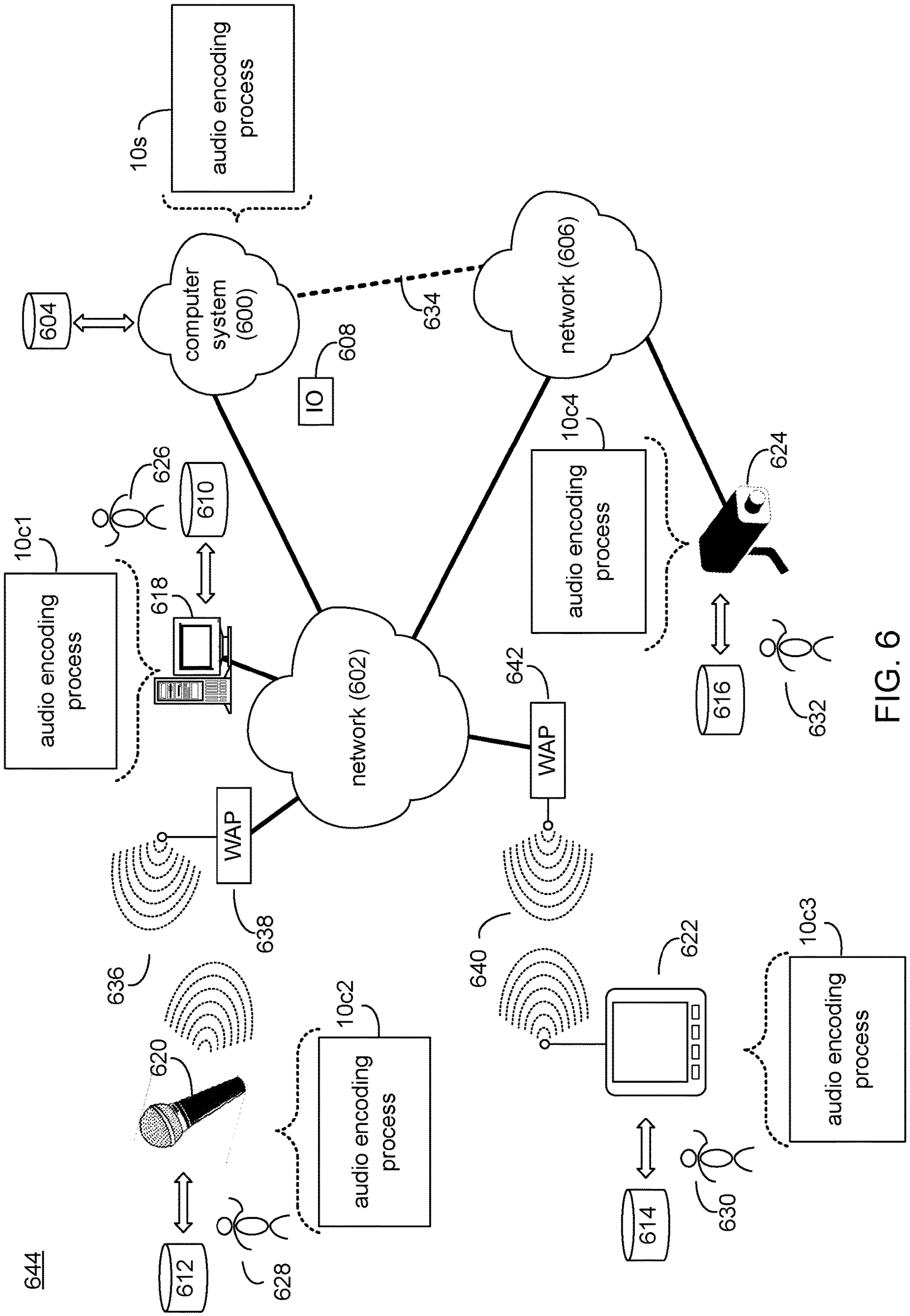
FIG. 6 is a diagrammatic view of computer system and an audio encoding process coupled to a distributed computing network.

System Overview:

Referring to FIG. 6, there is shown audio encoding process 10. Audio encoding process 10 may be implemented as a server-side process, a client-side process, or a hybrid server-side/client-side process. For example, audio encoding process 10 may be implemented as a purely server-side process via audio encoding process 10*s*. Alternatively, audio encoding process 10 may be implemented as a purely client-side process via one or more of audio encoding process 10*c*1, audio encoding process 10*c*2, audio encoding process 10*c*3, and audio encoding process 10*c*4. Alternatively still, audio encoding process 10 may be implemented as a hybrid server-side/client-side process via audio encoding process 10*s* in combination with one or more of audio encoding process 10*c*1, audio encoding process 10*c*2, audio encoding process 10*c*3, and audio encoding process 10*c*4.

Accordingly, audio encoding process 10 as used in this disclosure may include any combination of audio encoding process 10*s*, audio encoding process 10*c*1, audio encoding process 10*c*2, audio encoding process 10*c*3, and audio encoding process 10*c*4.

Audio encoding process 10*s* may be a server application and may reside on and may be executed by a computer system 600, which may be connected to network 602 (e.g., the Internet or a local area network). Computer system 600 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device and a NAS system. The various components of computer system 600 may execute one or more operating systems.

The instruction sets and subroutines of audio encoding process 10*s*, which may be stored on storage device 604 coupled to computer system 600, may be executed by one or more processors (not shown) and one or more memory architectures (not shown) included within computer system 600. Examples of storage device 604 may include but are not limited to: a hard disk drive; a RAID device; a random-access memory (RAM); a read-only memory (ROM); and all forms of flash memory storage devices.

Network 602 may be connected to one or more secondary networks (e.g., network 604), examples of which may include but are not limited to: a local area network; a wide area network; or an intranet, for example.

Various IO requests (e.g., IO request 608) may be sent from audio encoding process 10*s*, audio encoding process 10*c*1, audio encoding process 10*c*2, audio encoding process 10*c*3 and/or audio encoding process 10*c*4 to computer system 600. Examples of IO request 608 may include but are not limited to data write requests (i.e., a request that content be written to computer system 600) and data read requests (i.e., a request that content be read from computer system 600).

The instruction sets and subroutines of audio encoding process 10*c*1, audio encoding process 10*c*2, audio encoding process 10*c*3 and/or audio encoding process 10*c*4, which may be stored on storage devices 610, 612, 614, 616 (respectively) coupled to client electronic devices 618, 620, 622, 624 (respectively), may be executed by one or more processors (not shown) and one or more memory architectures (not shown) incorporated into client electronic devices 618, 620, 622, 624 (respectively). Storage devices 610, 612, 614, 616 may include but are not limited to: hard disk drives; optical drives; RAID devices; random access memories (RAM); read-only memories (ROM), and all forms of flash memory storage devices. Examples of client electronic devices 618, 620, 622, 624 may include, but are not limited to, personal computing device 618 (e.g., a smart phone, a personal digital assistant, a laptop computer, a notebook computer, and a desktop computer), audio input device 620 (e.g., a handheld microphone, a lapel microphone, an embedded microphone (such as those embedded within eyeglasses, smart phones, tablet computers and/or watches) and an audio recording device), display device 622 (e.g., a tablet computer, a computer monitor, and a smart television), machine vision input device 624 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 626, 628, 630, 632 may access computer system 600 directly through network 602 or through secondary network 606. Further, computer system 600 may be connected to network 602 through secondary network 606, as illustrated with link line 634.

The various client electronic devices (e.g., client electronic devices 618, 620, 622, 624) may be directly or indirectly coupled to network 602 (or network 606). For example, personal computing device 618 is shown directly coupled to network 602 via a hardwired network connection. Further, machine vision input device 624 is shown directly coupled to network 606 via a hardwired network connection. Audio input device 622 is shown wirelessly coupled to network 602 via wireless communication channel 636 established between audio input device 620 and wireless access point (i.e., WAP) 638, which is shown directly coupled to network 602. WAP 638 may be, for example, an IEEE 802.11a, 802.11b, 802.11g, 802.11n, Wi-Fi™, and/or Bluetooth™ device that is capable of establishing wireless communication channel 636 between audio input device 620 and WAP 638. Display device 622 is shown wirelessly coupled to network 602 via wireless communication channel 640 established between display device 622 and WAP 642, which is shown directly coupled to network 602.

The various client electronic devices (e.g., client electronic devices 618, 620, 622, 624) may each execute an operating system, wherein the combination of the various client electronic devices (e.g., client electronic devices 618, 620, 622, 624) and computer system 600 may form modular system 644.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:

receiving, by an audio encoder, a voice audio signal carrying Personally Identifiable Information (PII) of a speaker;

encoding the voice audio signal to obtain an encoded voice audio signal for securely communicating to a distributed speech processing machine learning (ML) model via a telecommunications network, wherein encoding the voice audio signal includes converting the voice audio signal into the modulation domain to obtain a modulation domain representation of the voice audio signal, encoding the modulation domain representation of the voice audio signal with a plurality of carrier signals and a plurality of modulator signals derived from the modulation domain representation of the voice audio signal, and converting the encoded modulation domain representation of the voice audio signal to the time domain to obtain the encoded voice audio signal; and transmitting, via the telecommunications network, the encoded voice audio signal to the distributed speech processing ML model.

2. The computer-implemented method of claim 1, wherein the distributed speech processing ML model is trained for speech recognition using training data that includes voice audio encoded in the modulation domain.

3. The computer-implemented method of claim 1, further comprising:

processing the encoded voice audio signal directly using the distributed speech processing ML model upon reception over the telecommunications network.

4. The computer-implemented method of claim 3, wherein encoding the modulation domain representation of the voice audio signal includes processing an encoding key defining an encoding process for the modulation domain representation of the voice audio signal.

5. The computer-implemented method of claim 4, wherein decoding the modulation domain representation of the encoded voice audio signal includes processing the encoding key to decode the encoded voice audio signal.

6. The computer-implemented method of claim 1, wherein encoding the modulation domain representation of the voice audio signal includes switching the plurality of modulator signals within a plurality of carrier-modulator signal pairs.

7. The computer-implemented method of claim 6, wherein switching the plurality of modulator signals within the plurality of carrier-modulator signal pairs includes switching frequency-adjacent modulator signals between the plurality of carrier-modulator signal pairs.

8. The computer-implemented method of claim 6, wherein encoding the modulation domain representation of the voice audio signal includes switching the plurality of modulator signals between the plurality of carrier-modulator signal pairs based upon, at least in part, pitch information associated with the voice audio signal.

9. A computing system comprising:

a processor; and a memory storing programming instructions for execution by the processor, the programming instructions, upon execution by the processor, causing the computing system to perform the following operations:

receiving, by an audio encoder, a voice audio signal carrying Personally Identifiable Information (PII) of a speaker;

encoding the voice audio signal to obtain an encoded voice audio signal for securely communicating to a distributed speech processing machine learning (ML) model via a telecommunications network, wherein encoding the voice audio signal includes converting the voice audio signal into the modulation domain to obtain a modulation domain representation of the voice audio signal, encoding the modulation domain representation of the voice audio signal with a plurality of carrier signals and a plurality of modulator signals derived from the modulation domain representation of the voice audio signal, and converting the encoded modulation domain representation of the voice audio signal to the time domain to obtain the encoded voice audio signal; and transmitting, via the telecommunications network, the encoded voice audio signal to the distributed speech processing ML model.

10. The computing system of claim 9, wherein the distributed speech processing ML model is trained for speech recognition using training data that includes voice audio encoded in the modulation domain.

11. The computing system of claim 9, wherein encoding the modulation domain representation of the voice audio signal includes switching the plurality of modulator signals within a plurality of carrier-modulator signal pairs.

12. The computing system of claim 11, wherein switching the plurality of modulator signals within the plurality of carrier-modulator signal pairs includes switching frequency-adjacent modulator signals between the plurality of carrier-modulator signal pairs.

13. The computing system of claim 12, wherein encoding the modulation domain representation of the voice audio signal includes switching the plurality of modulator signals between the plurality of carrier-modulator signal pairs based upon, at least in part, pitch information associated with the voice audio signal.

14. A computer program product residing on a non-transitory computer readable medium having programming instructions stored thereon which, when executed by a processor of a system, cause the system to perform the following operations:

receiving, by an audio encoder, a voice audio signal carrying Personally Identifiable Information (PII) of a speaker;

encoding the voice audio signal to obtain an encoded voice audio signal for securely communicating to a distributed speech processing machine learning (ML) model via a telecommunications network, wherein encoding the voice audio signal includes converting the voice audio signal into the modulation domain to obtain a modulation domain representation of the voice audio signal, encoding the modulation domain representation of the voice audio signal with a plurality of carrier signals and a plurality of modulator signals derived from the modulation domain representation of the voice audio signal to obtain the encoded voice audio signal, and converting the encoded modulation domain representation of the voice audio signal to the time domain to obtain the encoded voice audio signal; and transmitting, via the telecommunications network, the encoded voice audio signal to the distributed speech processing ML model.

15. The computer program product of claim 14, wherein the distributed speech processing ML model is trained for speech recognition using training data that includes voice audio encoded in the modulation domain.

16. The computer program product of claim 14, wherein encoding the modulation domain representation of the voice audio signal includes processing an encoding key defining an encoding process for the modulation domain representation of the voice audio signal.

17. The computer program product of claim 16, wherein decoding the modulation domain representation of the voice audio signal includes processing the encoding key to decode the modulation domain representation of the voice audio signal.

18. The computer program product of claim 14, wherein decoding the modulation domain representation of the voice audio signal includes switching the plurality of modulator signals within a plurality of carrier-modulator signal pairs.

19. The computer program product of claim 18, wherein switching the plurality of modulator signals within the plurality of carrier-modulator signal pairs includes switching frequency-adjacent modulator signals between the plurality of carrier-modulator signal pairs.

20. The computer program product of claim 18, wherein encoding the modulation domain representation of the voice audio signal includes switching the plurality of modulator signals between the plurality of carrier-modulator signal pairs based upon, at least in part, pitch information associated with the voice audio signal.

* * * * *